3,016,716
LIQUID OXYGEN COOLER FOR AIRBORNE INFRARED CELLS

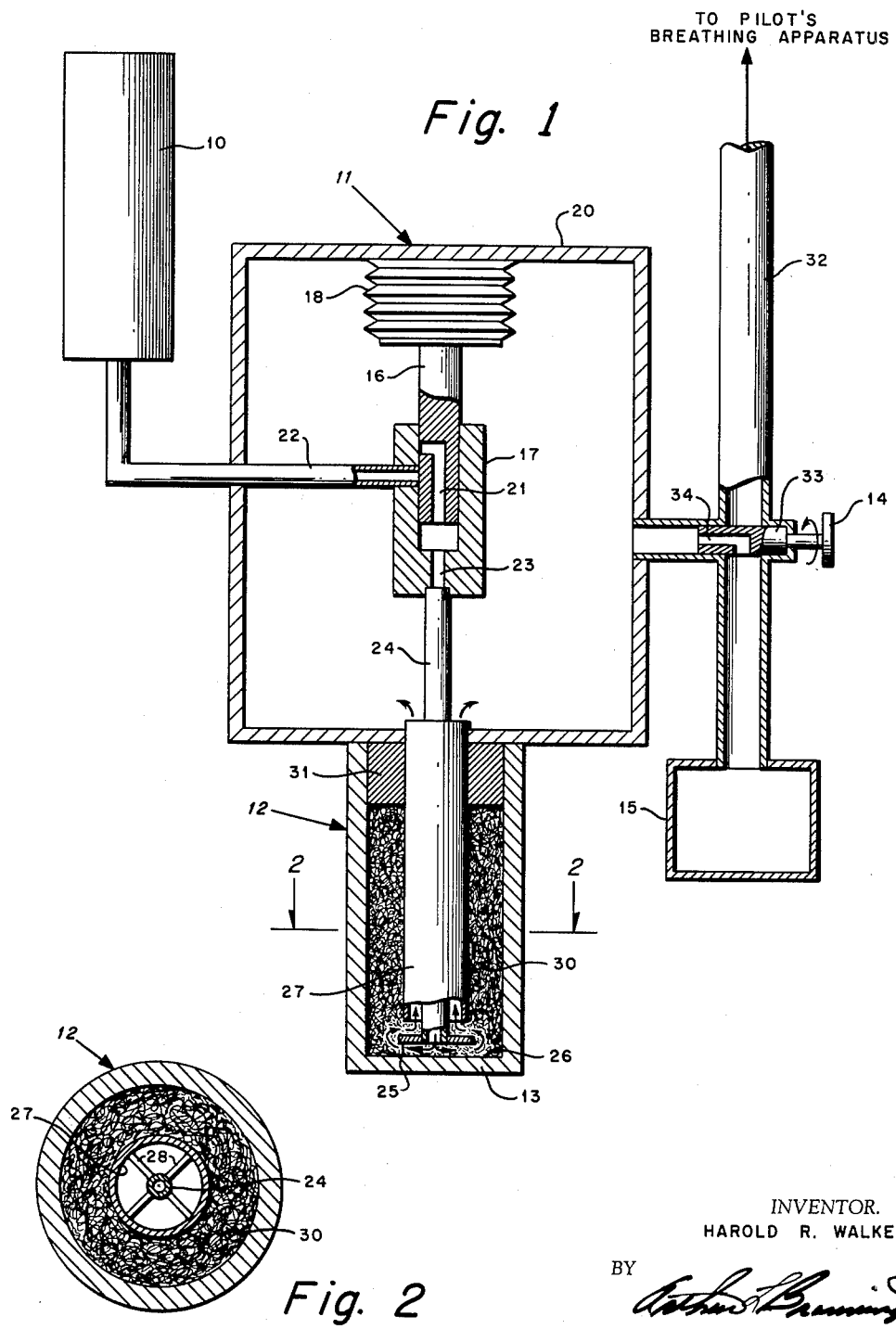

Harold R. Walker, Warminster, Pa., assignor to the United States of America as represented by the Secretary of the Navy
Filed Aug. 27, 1959, Ser. No. 836,561
4 Claims. (Cl. 62—52)
(Granted under Title 35, U.S. Code (1952), sec. 266)

The invention described herein may be manufactured and used by or for the Government of the United States of America for governmental purposes without the payment of any royalties thereon or therefor.

This invention relates to airborne equipment and more particularly to the cooling of airborne infrared cells.

Cooling is a particularly difficult problem in supersonic aircraft since refrigeration equipment is inherently relatively heavy, complicated, and space consuming. The foregoing disadvantageous characteristics present design and fabrication problems which no matter how resolved reduce the performance characteristics of an aircraft.

It is, therefore, a principal object of the invention to provide novel cooling means for airborne equipment relatively free of the above disadvantages.

Another object of the invention comprises the cooling of an infrared cell by using an airman's liquid oxygen supply as a coolant.

A further object of the invention is to provide, in combination, a means in an aircraft of vaporizing and warming an aircraft's liquid oxygen supply, which may be used for breathing purposes, and for cooling airborne equipment, which may include an infrared cell. The liquid oxygen supply and infrared cell are a particularly compatible combination since the infrared cell demands cooling usually only when airborne and there is a current demand for oxygen by the occupants of the aircraft.

The invention further resides in certain novel features of construction, combination and arrangements of parts, and further objects and advantages of the invention will be apparent to those skilled in the art to which it pertains from the following description of the present preferred embodiment thereof described with reference to the accompanying sheet of drawing, which forms a part of this specification, and wherein the same reference characters represent corresponding parts throughout the several views, and in which:

FIG. 1 is a fragmentary view, partially in cross section, of an apparatus embodying the invention; and FIG. 2 is a cross-sectional view along line 2—2 in FIG. 1.

It is to be understood that the invention is not limited to the details of construction and arrangement of parts shown in the sheet of drawing and hereinafter described in detail, but is capable of being otherwise embodied and of being practiced or carried out in various ways.

It is to be further understood that the phraseology or terminology employed herein is for the purpose of description and there is no intention to herein limit the invention beyond the requirements of the prior art.

Referring to FIG. 1, the apparatus embodying the invention comprises a liquid oxygen tank 10, a demand valve indicated generally by the reference numeral 11, a cooler indicated generally by the reference numeral 12 having an infrared transmissive window 13, a three-position control valve 14, and a storage tank 15.

The demand valve 11 comprises a plunger 16 adapted to be vertically and axially positioned in a coaxial, cylindrical, cup-shaped valve housing 17 by a pressure sensitive bellows 18 integrally connected to the upper end of the plunger 16 and the upper end wall of a hermetically sealed cylindrical chamber 20. The demand valve plunger 16 is provided with an L-shaped or dogleg-shaped orifice 21 adapted to connect a liquid oxygen supply line 22 with a vertical passageway 23 in the bottom of the valve housing 17 when the valve plunger 16 is bottomed in the housing 17. The plunger 16 is bottomed in the housing 17 when the bellows 18 is expanded during the occurrence of a low oxygen pressure condition within the chamber 20.

The liquid oxygen flows downwardly into the cooler 12 through a bellows hold line 24 extending from the housing 17 into the cooler 12. The upper end of the hold line 24 is integrally connected to the bottom of the valve housing 17 and communicates with the passageway 23. The lower end of the hold line 24 is concentric with and terminates near the bottom of the cooler 12, which is of a cylindrical, cup-shaped configuration and depends from the bottom end wall of the chamber 20. An annular radiator plate or fin 25 is disposed about and fixed to the lower terminal end of the hold line 24.

The infrared transmissive window 13 is parallelly disposed adjacent the cooling radiator fin 25 with the sensitive surface 26 thereof being on the inner, upper surface of the window 13 in closely-spaced relationship with the cooling fin 25.

Liquid oxygen, therefore, flows from tank 10 through the line 22, the orifice 21, the passageway 23, the hold line 24 into the cooler 12 and back into the chamber 20 via a concentric tubular return conduit 27. As best seen in FIG. 2, the conduit 27 is rigidly connected to the hold line 24 by means of four rectangular radially-extending strut member 28, which extend substantially the length of the conduit 27. The upper end of the conduit 27 is fixed within a circular, coaxial opening in the bottom of the chamber 20.

Preferably, the cooler is filled with a suitable lightweight insulating material 30, such as glass wool. In order to functionally seal the cooler 12, a suitable pressure seal 31 is fixed in the upper end of the cooler 12 in juxtaposition with the bottom wall of the chamber 20.

The vaporized oxygen filling the chamber 20 is metered to the pilot's breathing apparatus through a feed line 32, when required, by the angular adjustment of the pilot's valve 14. Alternatively, when the pilot's breathing apparatus is not in use, the pilot's valve 14 can be turned back through a half turn to divert the oxygen into the storage tank 15. The valve 14 comprises a cylindrical body 33 journaled in a T-shaped section of the line 32, a part of the line 32 being cylindrically embossed to hold one end of the body 33. The other end of the body 33, having an L-shaped or dogleg-shaped passage 34, is adapted to communicate with the chamber 20 and the portion of the line 32 leading to the pilot's breathing apparatus or to the storage tank 15, depending upon the angular position of the valve 14.

The valve 14 can also be positioned a quarter of a turn from that shown in FIG. 1 to a third position for shutting off any flow of oxygen through the line 32.

It is understood that the cooler 12 having the sensitive surface 26 can be changed according to the user's requirements. The cooler 12 has been illustrated for the sole purpose of illustrating a preferred form of the invention as it is the intention to hereby cover not only the above preferred construction, but all adaptations, modification, and uses thereof which come within the purview of those skilled in the art to which the invention relates, and the scope of the appended claims.

What is claimed is:

1. An apparatus of the character described comprising, a liquid oxygen tank, a cylindrical pressure chamber, a demand valve disposed within said pressure chamber and including a cup-shaped valve housing and a vertically slidable valve plunger disposed therein, a liquid oxygen supply line connecting said valve housing with said liquid oxygen tank, a pressure responsive hermetically sealed bellows fixed within said pressure chamber and the upper end of said valve plunger for axially positioning said valve plunger in said valve housing, said valve plunger having an L-shaped passage therein adapted to connect said supply line with the interior of said valve housing when said valve plunger is bottomed in said valve housing, a cylindrical cooler housing fixed to the bottomside of said pressure chamber coaxial with said valve plunger, a demand tube connecting the interior of said valve housing and said plunger passageway with the interior of said cooler housing, a return tube concentrically disposed about said demand tube, said return tube connecting the interior of said cooler housing with the interior of said pressure chamber and providing a supply of oxygen within said pressure chamber for acting on said bellows, an infrared transmissive window forming the bottom of said cooler housing, a sensitive element coating the inner surface of said window, an annular diffuser plate fixed to the lower end of said demand tube in close juxtaposition with said sensitive element for uniformly cooling the latter, glass wool insulation in said cooler housing, packing ring means in said cooler housing cooperating with said bottomside of said pressure chamber for hermetically sealing said cooler housing, a T-shaped oxygen conduit having the leg thereof communicating with the interior of said pressure chamber, one arm of said T-shaped oxygen conduit being adapted to be connected to a pilot's oxygen breathing apparatus, a storage tank communicating with the other arm of said T-shaped oxygen conduit, a three position valve having a cylindrical valve body journaled at the junction of said arms and said leg of said T-shaped oxygen conduit, said valve body having an L-shaped passageway therein for permitting either arm of said T-shaped oxygen conduit to be selectively connected with said pressure chamber, and manually operated knob means for controlling the angular position of said valve body.

2. An apparatus of the character described comprising, a liquid oxygen tank, a cylindrical pressure chamber, a demand valve disposed within said pressure chamber and including a cup-shaped valve housing and a vertically slidable valve plunger disposed therein, a liquid oxygen supply line connecting said valve housing with said liquid oxygen tank, a pressure responsive hermetically sealed bellows fixed within said pressure chamber and the upper end of said valve plunger for axially positioning said valve plunger in said valve housing, said valve plunger having an L-shaped passage therein adapted to connect said supply line with the interior of said valve housing when said valve plunger is bottomed in said valve housing, a cylindrical cooler housing fixed in the bottomside of said pressure chamber coaxial with said valve plunger, a demand tube connecting the interior of said valve housing and said plunger passageway with the interior of said cooler housing, a return tube concentrically disposed about said demand tube, radial struts rigidly connecting said demand tube within said return tube, said return tube connecting the interior of said cooler housing with the interior of said pressure chamber and providing a supply of oxygen within said pressure chamber for acting on said bellows, a transmissive window forming the bottom of said cooler housing, a sensitive element coating the inner surface of said window, and conduit means for exhausting oxygen from said pressure chamber.

3. An apparatus of the character described comprising, a liquid oxygen tank, a cylindrical pressure chamber, a demand valve disposed within said pressure chamber and including a cup-shaped valve housing and a vertically slidable valve plunger disposed therein, a liquid oxygen supply line connecting said valve housing with said liquid oxygen tank, a pressure responsive hermetically sealed bellows fixed within said pressure chamber and the upper end of said valve plunger for axially positioning said valve plunger in said valve housing, said valve plunger having an L-shaped passage therein adapted to connect said supply line with the interior of said valve housing when said valve plunger is bottomed in said valve housing, a cylindrical cooler housing fixed to the bottom-side of said pressure chamber coaxial with said valve plunger, a demand tube connecting the interior of said valve housing and said plunger passageway with the interior of said cooler housing, a return tube concentrically disposed about said demand tube, said return tube connecting the interior of said cooler housing with the interior of said pressure chamber and providing a supply of oxygen within said pressure chamber for acting on said bellows, and glass wool insulation in said cooler housing.

4. An airborne equipment cooler utilizing a liquid coolant comprising, a cooler chamber, a pressure chamber communicating with said cooler chamber, demand valve means within said pressure chamber for regulating the flow of the liquid coolant to said cooler chamber, pressure responsive means in said pressure chamber for regulating said demand valve means, conduit means for conducting the coolant from said demand valve means to said cooler chamber and into said pressure chamber for acting on said pressure responsive means so that coolant will be supplied to said cooler chamber as required, an infrared transmissive window having a sensitive surface in said cooler chamber, a lead line adapted to be connected to a coolant exhaust apparatus communicating with said pressure chamber, a storage tank communicating with said lead line, and a multiple-position valve controlling the flow of the coolant from said pressure chamber to the coolant exhaust apparatus and the storage tank.

References Cited in the file of this patent

UNITED STATES PATENTS

| | | |
|---|---|---|
| 1,823,899 | Hull | Sept. 22, 1931 |
| 2,133,950 | Buchanan | Oct. 25, 1938 |
| 2,182,664 | Gowans | Dec. 5, 1939 |
| 2,423,631 | Akerman et al. | July 8, 1947 |